United States Patent [19]
DeGraw

[11] 3,866,258
[45] Feb. 18, 1975

[54] WIPER ASSEMBLY FOR SIDE-MOUNTED REAR VIEW MIRROR

[76] Inventor: Frank B. DeGraw, Rt. No. 1, Hudson, Ind. 46747

[22] Filed: Sept. 26, 1973

[21] Appl. No.: 400,845

[52] U.S. Cl. ............................ 15/250.29, 15/250.15
[51] Int. Cl. ............................ B60s 1/12, B60s 1/44
[58] Field of Search ....... 15/250.29, 250.30, 250.27, 15/250.15, 250.16

[56] References Cited
UNITED STATES PATENTS

| | | | |
|---|---|---|---|
| 1,305,278 | 6/1919 | Graham | 15/250.15 |
| 2,913,754 | 11/1959 | Vander Zee | 15/250.30 |
| 3,158,935 | 12/1964 | Rosenthal | 15/250.29 X |
| 3,685,087 | 8/1972 | Pittman | 15/250.29 UX |

FOREIGN PATENTS OR APPLICATIONS

| | | | |
|---|---|---|---|
| 978,450 | 12/1964 | Great Britain | 18/250.3 |

*Primary Examiner*—Peter Feldman

[57] ABSTRACT

A wiper assembly for a side-mounted rear view mirror including a wiper blade arranged for transverse, linear movement across the mirror surface. A pair of spaced, parallel, transversely extending fluid power cylinders are mounted on the rear side of the mirror mounting frame and have their piston rods respectively connected to the wiper blade for maintaining the same in engagement with the mirror surface and for moving the same transversely in reciprocal fashion thereacross upon extension and retraction of the piston rods. A selectively actuable fluid valve on the rear side of the mounting frame is coupled to the cylinders and adapted to be connected to a source of fluid under pressure, the pistons and piston rods being extended in response to actuation of the valve thereby to move the wiper blade transversely across the mirror surface in one direction from one edge thereof to the other. A spring acts on the piston rods for returning the same to their retracted position thereby moving the wiper blade transversely across the mirror surface in the opposite direction. A linkage is provided for deactuating the valve in response to substantially full extension of the piston rods so as to permit the spring to retract the piston rods, the linkage again actuating the valve in response to substantially complete retraction of the piston rods.

9 Claims, 2 Drawing Figures

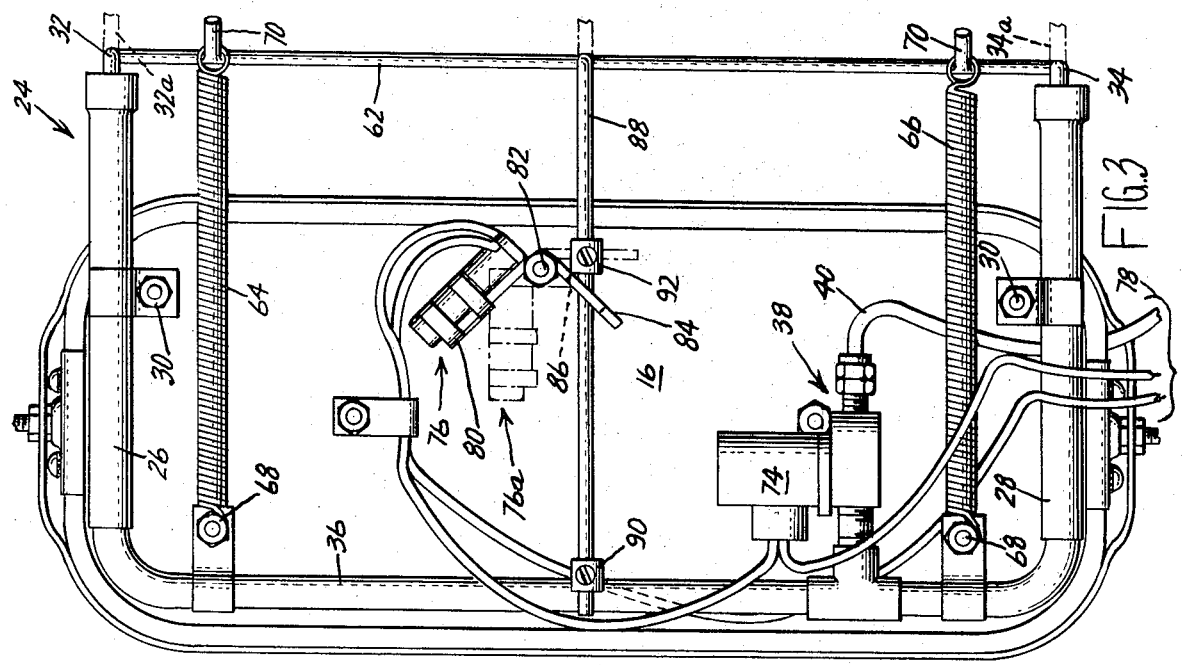
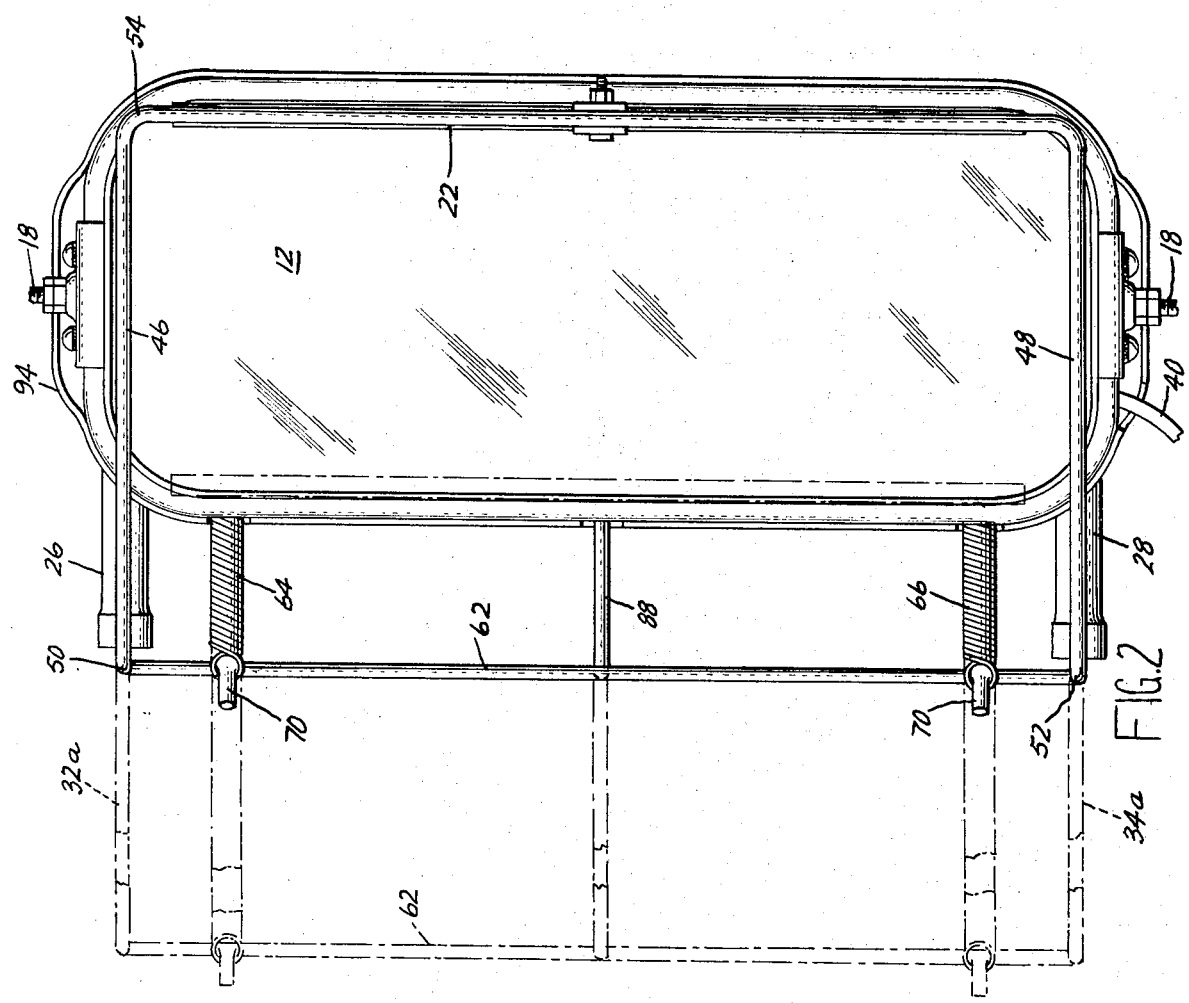

WIPER ASSEMBLY FOR SIDE-MOUNTED REAR VIEW MIRROR

BACKGROUND OF THE INVENTION

1. Field of the Invention

This invention relates generally to wiper assemblies for vehicular rear view mirrors, and more particularly to a wiper assembly for a side-mounted rear view mirror.

2. DESCRIPTION OF THE PRIOR ART

Large, side-mounted rear view mirrors are extensively used on trucks and an unrestricted view in such mirrors is essential for safe operation however, rain, dew and the like inhibit such unrestricted view. Various wiper arrangements for rear view mirrors have been proposed including the use of a laterally movable wiper blade in conjunction with a side-mounted rear view mirror. However, to the best of the present applicant's knowledge, such prior laterally movable wiper blades used in conjunction with side-mounted rear view mirrors have been actuated by a continuously rotating drive motor coupled to the blade by complicated linkages such as a scotch yoke mechanism.

Since cost and reliability are important considerations in a wiper assembly for a rear view mirror, it is desirable to provide a wiper assembly for a side-mounted rear view mirror characterized by its simplicity and ease of assembly.

SUMMARY OF THE INVENTION

The invention, in its broader aspects, provides a wiper blade disposed for transverse, linear movement across the reflecting surface of a mirror which is mounted on a frame having a rear side. At least one transversely extending fluid power cylinder is mounted on the rear side of the mounting frame and has a piston and extensible piston rod. Means are provided connecting the piston rod to the wiper blade for maintaining the blade in engagement with the mirror surface and for moving the same transversely in reciprocal fashion thereacross upon extension and retraction of the piston rod. A selectively actuable fluid valve is provided on the rear side of the mounting frame coupled to the cylinder and adapted to be connected to a source of fluid under pressure, such as compressed air, whereby the piston and piston rod are extended in response to actuation of the valve thereby moving the wiper blade transversely across the mirror surface in one direction from one edge thereof to the other. Spring means is provided acting on the piston rod for returning the same to its retracted position thereby moving the wiper blades transversely across the mirror surface in the opposite direction from the other edge thereof to the one edge, and means are provided responsive to substantially fully extension of the piston rod for deactuating the valve thereby permitting the spring means to retract the piston rod, and for again actuating the valve in response to substantially complete retraction of the piston rod.

It is accordingly an object of the present invention to provide an improved wiper assembly for a side-mounted rear view mirror.

Another object of the invention is to provide an improved wiper assembly of the laterally movable type for a side-mounted rear view mirror.

A further object of the invention is to provide an improved wiper assembly for a side-mounted rear view mirror characterized by its simplicity.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 2 is a front view of the wiper assembly of FIG. 1; and

FIG. 3 is a rear view of the assembly with the housing removed.

DESCRIPTION OF THE PREFERRED EMBODIMENT

Figure 1:
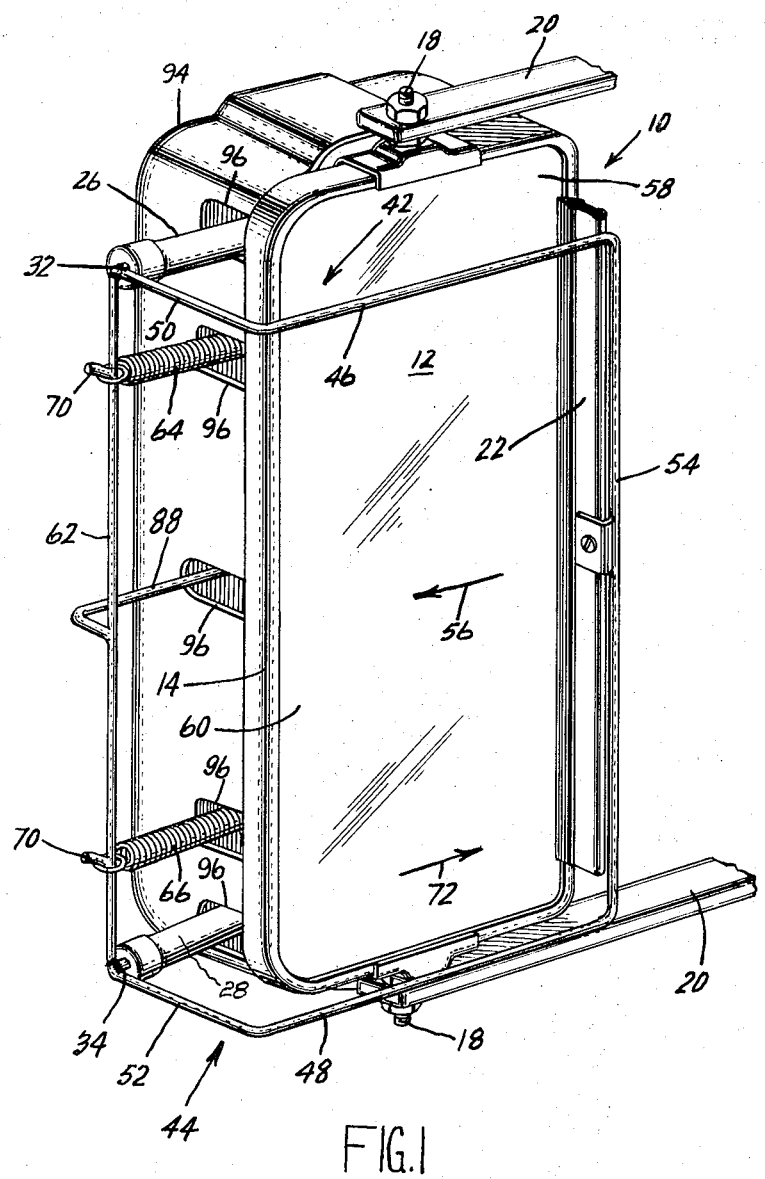
FIG. 1 is a front, perspective view showing the improved wiper assembly of the invention.

Referring now to the figures of the drawing, a rearview mirror assembly 10 is shown comprising a mirror having a front, reflective surface 12 mounted in metal mounting frame 14 having rear side 16. Frame 14 is pivotally mounted by means of studs 18 on brackets 20 adapted to mount the mirror assembly 10 on either side of a vehicle in conventional fashion.

Wiper blade 22 is maintained in wiping engagement with surface 12 of mirror assembly 10 and is moved laterally across the same by actuating mechanism 24. Actuating mechanism 24 comprises a pair of cylinders 26, 28 mounted on rear side 16 of frame 14 by brackets 30, cylinders 26, 28 being laterally extending and vertically spaced-apart, as shown in FIG. 3. Cylinders 26, 28 have pistons therein (not shown) connected to extensible piston rods 32, 34.

Conduit 36 is coupled to cylinders 26, 28 for applying fluid under pressure, such as compressed air, thereto thereby to extend the respective pistons and piston rods 32, 34, as shown in dashed lines at 32a, 34a. Solenoid valve 38 couples conduit 36 to flexible hose 40 which is adapted to be coupled to a source of fluid under pressure, such as the compressed air tank of the vehicle upon which wiper assembly 10 is mounted. Thus, actuation of valve 38 will apply fluid under pressure to cylinders 26, 28 to extend the pistons and piston rods 32, 34.

In the illustrated embodiment, piston rods 32, 34 are integrally formed as a part of U-shaped elements 42, 44 having leg portions 46, 48 joined to piston rods 32, 34 by bight portions 50, 52. Leg portions 46, 48 extend laterally across outer surface 12 of mirror assembly 10 and have their outer ends integrally connected by element 54 to which wiper blade 22 is connected. Mirror assembly 10 is thus disposed between leg portions 46, 48 and piston rods 32, 34 which comprise the U-shaped elements 42, 44. It will thus be seen that application of fluid under pressure from flexible line 40 by valve 38 to conduit 36 and cylinders 26, 28 resulting in extension of piston rods 32, 34 will result in movement of wiper blade 22 in one direction shown by arrow 56 laterally across surface 12 of mirror assembly 10 from one side edge 58 to the outer side edge 60.

Element 62 is connected to piston rods 32, 34 at their junctions with bight portions 50, 52. Springs 64, 66 are provided each having one end connected to rear side 16 of mounting frame 14, as by threaded fasteners 68, and its other end connected to a hook element 70 extending from element 62. It will thus be seen that upon deactuation of valve 38 thus removing fluid pressure from cylinders 26, 28, springs 64, 66 acting on element 62 and piston rods 32, 34 will retract piston rods 32, 34 thus moving wiper blade 22 in the other direction shown by arrow 72 laterally across surface 12 of mirror assembly 10 from side edge 60 to side edge 58, cylinders 26, 28 exhausting through valve 38.

Solenoid 74 of valve 38 is coupled in series with mercury switch 76 by electrical leads 78 adapted to be connected to the electrical system of the vehicle to which mirror assembly 10 is attached. Mercury switch 76 is mounted on bracket 80 pivotally connected to rear side 16 of mounting frame 14 as at 82. Bracket 80 has leg portion 84 having slot 86 therein through which rod 88 extends. Rod 88 is connected to element 62 and is thus moved laterally therewith in response to extension and retraction of piston rods 32, 34. Spaced, adjustable abutment members 90, 92 on rod 88 actuate mercury switch 76 between its position shown in solid lines and its position shown in dashed lines at 76a in response to substantially complete extension of piston rods 32, 34 with wiper blade 22 at side edge 60 of surface 12 of mirror 10, and substantially complete retraction of piston rods 32, 34 with wiper blade 22 at side edge 58. Thus, when piston rods 32, 34 are substantially fully extended, abutment 90 engages arm 84 of bracket 80 thus moving the same and mercury switch 76 to position 76a so as to de-energize solenoid 74 of valve 38 to remove fluid pressure from cylinders 26, 28. Spring 64, 66 then returns piston rods 32, 34 to their substantially fully retracted positions, valve 38 exhausting fluid from cylinders 26, 28, thus moving the wiper blade 22 in direction 72 from side edge 60 to side edge 58 of surface 12 of mirror assembly 10. When piston rods 32, 34 approach their substantially fully retracted positions, abutment 92 engages arm 84 of bracket 80 moving switch 76 to the position shown in solid lines in FIG. 3 again energizing solenoid 74 of valve 38 to apply fluid pressure to cylinders 26, 28, thus extending piston rods 32, 34 and moving wiper blade 22 in direction 56 from side edge 58 to side edge 60 of front surface 12 of mirror assembly 10.

Actuating mechanism 24 is enclosed by housing 94 removably secured to mounting frame 14 and having openings 96 in side wall thereof accomodating cylinders 26, 28, springs 64, 66 and switch-actuating rod 88.

While there have been described above the principles of this invention in connection with specific apparatus, it is to be clearly understood that this description is made only by way of example and not as a limitation to the scope of the invention.

What is claimed is:

1. In combination with a side-mounted rear view mirror assembly including a mirror having a front, reflective surface and a mounting frame therefor having a rear side, a wiper assembly comprising: a wiper blade disposed for transverse, linear movement across said mirror surface, at least one transversely extending fluid power cylinder mounted on said rear side of said mounting frame and having a piston and extensible piston rod, means connecting said piston rod to said wiper blade for maintaining the same in engagement with said mirror surface and moving said wiper blade transversely there-across in reciprocal fashion upon extension and retraction of said piston rod, a solenoid-actuated fluid valve on said rear side of said mounting frame coupled to said cylinder and adapted to be connected to a source of fluid under pressure whereby said piston and piston rod are extended in response to actuation of said valve thereby moving said wiper blade transversely across said mirror surface in one direction from one edge thereof to the other, spring means acting on said piston rod for returning the same to its retracted position thereby moving said wiper blade transversely across said mirror surface in the opposite direction from said other edge thereof to said one edge, and means including a switch coupled to said solenoid and a linkage operatively connecting said piston rod to said switch for deactuating said valve responsive to substantially full extension of said piston rod thereby permitting said spring means to retract said piston rod and for again actuating said valve in response to substantially complete retraction of said piston rod.

2. The wiper assembly of claim 1 wherein there are two of said cylinders in spaced, parallel relationship.

3. The wiper assembly of claim 2 wherein said connecting means comprises a pair of generally U-shaped elements each having one leg portion connected to a respective piston rod and the other leg portion connected to said wiper blade with said mirror assembly disposed between said leg portions, and an element connecting said U-shaped elements, said spring means being connected between said last-named element and said rear side of said mounting frame.

4. The wiper assembly of claim 3 wherein each of said piston rods is integral with a respective leg portion.

5. The wiper assembly of claim 1 wherein said linkage includes a lost motion connection.

6. The wiper assembly of claim 1 wherein there are two of said cylinders in spaced, parallel relationship, said connecting means comprising a pair of generally U-shaped shaped elements each having one leg portion connected to a respective piston rod and the other leg portion connected to said wiper blade with said mirror assembly disposed between said leg portions, and a third element connecting said one leg portions, said spring means being connected between said third element and said rear side of said mounting frame, said linkage including another element connected to said third element and operatively connected to said switch by a lost motion connection.

7. The wiper assembly of claim 6 wherein said switch is a mercury switch pivotally mounted on said rear side of said mounting frame.

8. The wiper assembly of claim 6 wherein each of said piston rods is integral with a respective leg portion, said other leg portion respectively being normal to said wiper blade and having outer ends integrally joined by a fourth element, said fourth element being parallel with said wiper blade and secured thereto.

9. The wiper assembly of claim 6 further comprising a housing enclosing said cylinders, valve and switch, and connected to said mounting frame.

* * * * *